US012792149B2

(12) United States Patent
Chin et al.

(10) Patent No.: US 12,792,149 B2
(45) Date of Patent: Nov. 10, 2026

(54) DISPLAY DEVICE

(71) Applicant: LG DISPLAY CO., LTD., Seoul (KR)

(72) Inventors: MiHyung Chin, Gwangmyeong-si (KR); Myungeun Song, Seoul (KR); JunHa Hwang, Siheung-si (KR)

(73) Assignee: LG Display Co., Ltd. (KR)

( * ) Notice: Subject to any disclaimer, the term of this patent is extended or adjusted under 35 U.S.C. 154(b) by 873 days.

(21) Appl. No.: 17/856,359

(22) Filed: Jul. 1, 2022

(65) Prior Publication Data

US 2023/0017868 A1 Jan. 19, 2023

(30) Foreign Application Priority Data

Jul. 8, 2021 (KR) ........................ 10-2021-0089998

(51) Int. Cl.

| | |
|---|---|
| ***G06F 3/01*** | (2006.01) |
| ***C09J 7/10*** | (2018.01) |
| ***C09J 7/30*** | (2018.01) |
| ***C09J 133/08*** | (2006.01) |
| ***G06F 3/041*** | (2006.01) |
| ***H04M 1/02*** | (2006.01) |

(52) U.S. Cl.

CPC ................ *G06F 3/016* (2013.01); *C09J 7/10* (2018.01); *C09J 7/30* (2018.01); *C09J 133/08* (2013.01); *G06F 3/041* (2013.01); *H04M 1/026* (2013.01); *H04M 1/0266* (2013.01); *C09J 2301/208* (2020.08); *C09J 2433/00* (2013.01); *G06F 3/0412* (2013.01); *G06F 2203/04103* (2013.01); *H04M 2250/22* (2013.01)

(58) Field of Classification Search

None

See application file for complete search history.

(56) References Cited

U.S. PATENT DOCUMENTS

| | | | | |
|---|---|---|---|---|
| 2004/0191509 | A1* | 9/2004 | Kishioka | G06F 3/0412 428/354 |
| 2013/0141786 | A1 | 6/2013 | Jeong et al. | |
| 2016/0101593 | A1 | 4/2016 | Nam et al. | |
| 2019/0378382 | A1* | 12/2019 | Khoshkava | G06F 3/016 |
| 2020/0026357 | A1* | 1/2020 | Kirsch | B60K 35/10 |
| 2021/0184161 | A1 | 6/2021 | Song et al. | |
| 2022/0388276 | A1* | 12/2022 | Wu | B32B 7/12 |

FOREIGN PATENT DOCUMENTS

| | | | |
|---|---|---|---|
| CN | 103135161 | A | 6/2013 |
| CN | 103214979 | A | 7/2013 |
| CN | 103698404 | A | 4/2014 |
| CN | 110573994 | A | 12/2019 |
| CN | 112992972 | A | 6/2021 |
| KR | 10-0383522 | B | 8/2003 |
| KR | 10-2017-0079954 | A | 7/2017 |
| KR | 10-2018-0001391 | A | 1/2018 |
| KR | 10-2019-0119090 | A | 10/2019 |

* cited by examiner

*Primary Examiner* — Eli D. Strah

(74) *Attorney, Agent, or Firm* — Fish & Richardson P.C.

(57) ABSTRACT

A display device includes a display panel, an adhesive layer on the display panel and comprising a plurality of layers having different loss modulus and glass transition temperatures Tg, a cover window on the adhesive layer, and an actuator at the cover window. Then, the adhesive layer includes a first adhesive layer having a lower loss modulus and a glass transition temperature Tg and a second adhesive layer having a higher loss modulus and a glass transition temperature Tg.

8 Claims, 4 Drawing Sheets

DISPLAY DEVICE

CROSS-REFERENCE TO RELATED APPLICATION

This application claims the priority of Korean Patent Application No. 10-2021-0089998 filed on Jul. 8, 2021, which is hereby incorporated by reference in its entirety.

BACKGROUND

Field of the Disclosure

The present disclosure relates to a display device, and more particularly, to a haptic display device which efficiently provides an electrovibration to a user.

Description of the Background

A touch panel is one of input devices which allows a user to make a direct contact with a screen with a finger or a pen to input information while looking at the display device. A touch panel is being commercially used not only for portable information devices such as smart phones or tablet PCs and electronic devices such as notebook computers, monitors, and televisions, but also for display devices for vehicles.

In recent years, a haptic technique which provides electrovibration to a human skin using an electric field (or a frictional force) is being developed together with the touch technique. Here, the haptic is a tactile feedback technique which utilizes perception using human tactile organs and allows feeling of various surface textures when it is touched.

In order to provide a satisfactory haptic feedback to a user, in the haptic display device, vibration generated in an actuator needs to be provided to the user without being damped. However, the haptic display device which is being currently manufactured has a difficulty to simultaneously implement the reliability and a haptic performance.

SUMMARY

Accordingly, the present disclosure is to provide a display device which can minimize an amount of vibration damped during the process of transmitting the vibration generated in an actuator to a center of the display device.

The present disclosure is also to provide a display device with an improved haptic performance and an improved reliability, simultaneously.

Further, the present disclosure is to provide a display device which has an improved visibility by minimizing a difference of refractive indexes of a plurality of adhesive layers.

The present disclosure is not limited to the above-mentioned, and other features, which are not mentioned above, can be clearly understood by those skilled in the art from the following descriptions.

According to an aspect of the present disclosure, a display device includes a display panel, a second adhesive layer disposed on the display panel, a first adhesive layer which is disposed on the second adhesive layer and has a lower loss modulus or a lower glass transition temperature Tg than that of the second adhesive layer, and a cover window disposed on the first adhesive layer.

According to another aspect of the present disclosure, a display device includes: a display panel, a second adhesive layer disposed on the display panel, a first adhesive layer which is disposed on the second adhesive layer and has a lower loss modulus or a lower glass transition temperature Tg than that of the second adhesive layer, and a cover window disposed on the first adhesive layer. At this time, a thickness of the first adhesive layer is smaller than a thickness of the second adhesive layer.

According to still another aspect of the present disclosure, a display device includes: a display panel, a first adhesive layer disposed on the display panel, a second adhesive layer which is disposed on the first adhesive layer and has a higher loss modulus or a higher glass transition temperature Tg than that of the first adhesive layer, and a cover window disposed on the second adhesive layer. At this time, a thickness of the first adhesive layer is smaller than a thickness of the second adhesive layer.

Other detailed matters of the exemplary aspects are included in the detailed description and the drawings.

According to the present disclosure, a plurality of adhesive layers having different physical properties is formed so that even though the vibration starting from an outer periphery of the display device passes through the adhesive layer, the vibration is transmitted to the center of the display device without being significantly damped, that is, a damping ratio is low.

According to the present disclosure, the vibration is transmitted to the center of the panel with a minimum damped amount so that the vibration is effectively transmitted to the user, thereby increasing the haptic performance.

According to the present disclosure, a haptic display device which simultaneously implements a haptic performance and a reliability is provided to be effectively applied to a touch display device.

According to the present disclosure, materials in the same series are applied to the plurality of adhesive layers so that the difference in the refractive indexes is minimized to provide excellent visibility.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
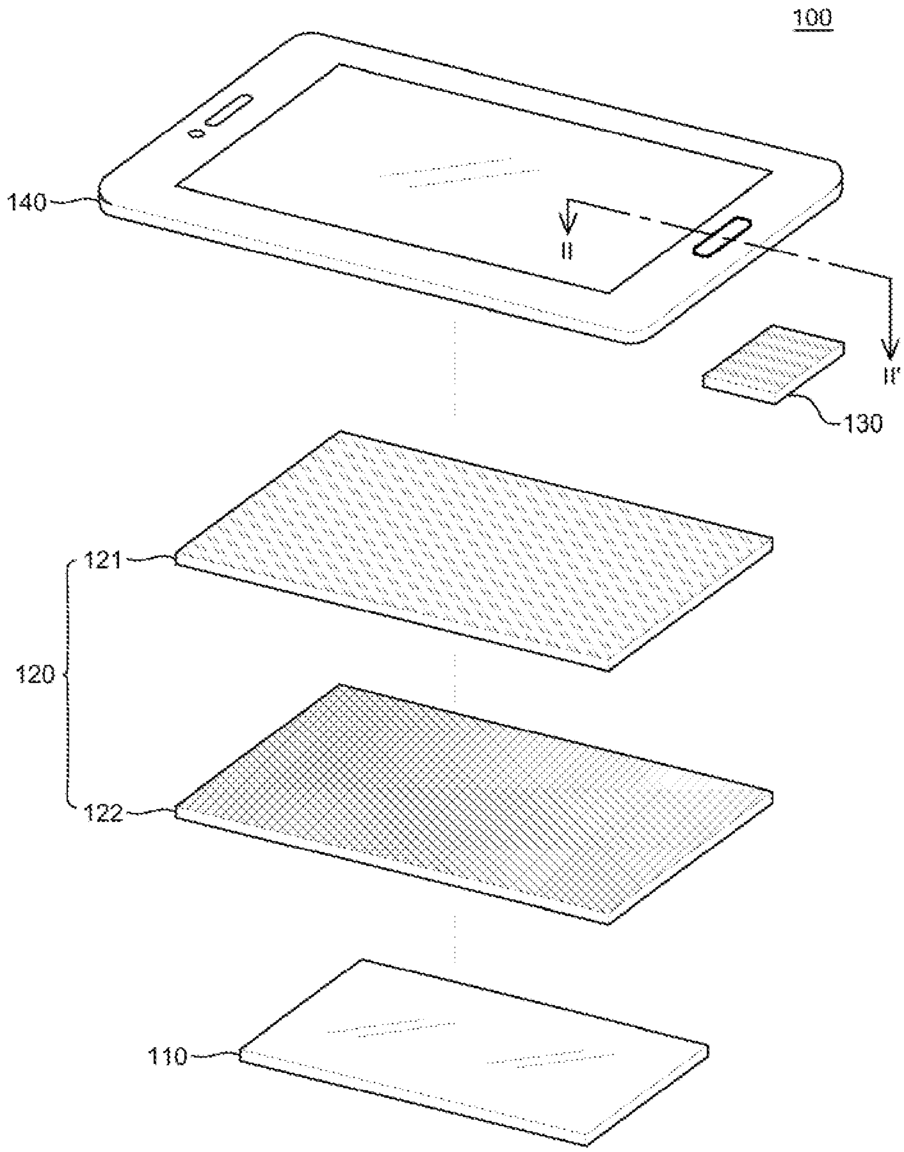
FIG. 1 is an exploded perspective view of a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Unless otherwise stated in this specification, a glass transition temperature Tg, a storage modulus, and a loss modulus may be measured using a dynamic shear rheometer. For example, a rotary rheometer (ARES-G2) of Waters-TA Corporation is used to measure the glass transition temperature, the storage modulus, and the loss modulus in a dynamic temperature sweep mode. Specifically, a shear storage modulus G', a shear loss modulus G" and a tangent delta G"/G' are measured while raising a temperature at a rate of 5° C./min in a temperature range of −60° C. to 100° C. under the conditions of a strain of 1% and a frequency of 1 Hz. Generally, a glass transition temperature Tg using the rheometer is considered as a temperature at a maximum value of the tangent delta.

Hereinafter, various exemplary aspects of the present disclosure will be described in detail with reference to accompanying drawings.

Figure 2:
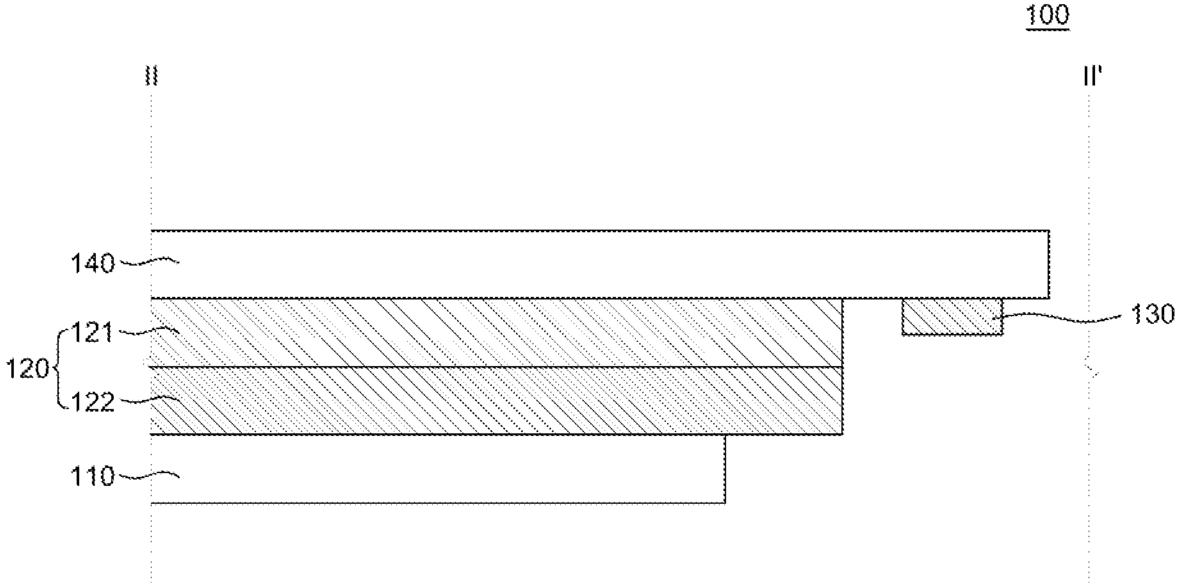
FIG. 2 is a schematic cross-sectional view of a display device according to an exemplary aspect of the present disclosure.

FIG. 1 is an exploded perspective view of a display device 100 according to an aspect of the present disclosure. FIG. 2 is a schematic cross-sectional view of a display device 100 according to an exemplary aspect of the present disclosure.

Referring to FIGS. 1 and 2, the display device 100 includes a display panel 110, an adhesive layer 120, a cover window 140, and an actuator 130.

Referring to FIGS. 1 and 2, the display panel 110 is a panel which displays images to a user. The display panel 110 includes a display area and a non-display area. The display area is an area where a plurality of pixels is disposed to display images. In the display area, pixels including an emission area for displaying images and a driving circuit for driving the pixels may be disposed. The pixel may include a plurality of sub pixels. The sub pixel is a minimum unit which configures the display area and each sub pixel may be configured to emit light of a specific wavelength band. For example, each sub pixel may be configured to emit red light, green light, blue light, or white light. The non-display area is disposed so as to enclose the display area. The non-display area is an area where images are not displayed and various wiring lines, driving ICs, and printed circuit boards for driving the pixels and the driving circuits disposed in the display area are disposed. In the non-display area, various ICs such as a gate driver IC and a data driver IC may be disposed. In the meantime, as described above, in the non-display area, the driving IC and the printed circuit board may be disposed and a predetermined area is necessary to dispose the driving IC, the printed circuit board, and the like.

For example, the display panel 110 may be a liquid crystal display panel which includes a liquid crystal layer and adjusts a light transmittance of liquid crystals to display images. As another example, the display panel 110 may be an organic light emitting display panel which includes an organic light emitting layer to display images using light emitted from the organic light emitting layer. The organic light emitting display panel is a self-emitting device which does not require a separate light source, unlike the liquid crystal display panel, and is thin and has an excellent flexibility. Hereinafter, for the convenience of description, the display panel 110 is assumed as a liquid crystal display panel, but is not limited thereto.

When the display panel 110 is a liquid crystal display panel, the display panel 110 includes a lower substrate, an upper substrate, a lower polarizer, and an upper polarizer. Further, the display panel 110 includes a liquid crystal layer which is disposed between the lower substrate and the upper substrate which are opposite to each other and includes liquid crystal molecules. Further, a backlight unit, a light guide plate, and the like may be disposed below the display panel 110.

The lower substrate is a substrate which supports various components which configure the display panel 110 and on the lower substrate, a thin film transistor (TFT), a pixel electrode electrically connected to the thin film transistor, and a common electrode which forms an electric field with the pixel electrode are disposed. Therefore, the lower substrate may be referred to as a thin film transistor substrate. The thin film transistor forms an electric field between the pixel electrode and the common electrode based on a driving signal transmitted through the wiring line.

The upper substrate is opposite to the lower substrate. The upper substrate is a substrate which supports a color filter layer and is referred to as a color filter substrate. The color filter layer selectively transmits light having a specific wavelength. A full color image is displayed by means of the color filter layer.

Polarizers which transmit only linearly polarized light in a specific direction may be attached on outer surfaces of the lower substrate and the upper substrate. Specifically, a lower polarizer is disposed on a lower surface of the lower substrate and an upper polarizer is disposed on an upper surface of the upper substrate. Areas of the lower polarizer and the upper polarizer are larger than the display area and smaller than the display panel 110.

The lower polarizer and the upper polarizer may be formed by stretching poly-vinyl alcohol (PVA) dyed with iodine (I). In the lower polarizer and the upper polarizer, an absorption axis is formed in the stretching direction so that light vibrating in a direction parallel to the absorption axis is absorbed and only light vibrating in a direction perpendicular to the absorption axis is selectively transmitted. In the liquid crystal display device, a light transmission axis of the lower polarizer may be disposed to be perpendicular to a light transmission axis of the upper polarizer.

The cover window 140 is disposed on the display panel 110 and the adhesive layer 120. The cover window 140 protects the display panel 110 from the external impact and scratches and suppresses the deterioration of the display panel due to external air such as the moisture or oxygen.

The cover window 140 may include at least one cover glass. The cover glass has advantages in that the optical characteristic is excellent and the strength and the impact resistance are high, and a surface hardness is excellent as compared to the cover plastic formed of transparent resin.

The actuator 130 is disposed so as to be in direct contact with a lower surface of the cover window 140 and is spaced apart from a side surface of the adhesive layer 120. That is, the adhesive layer 120 and the display panel 110 are disposed in a center portion of the display device 100 and the actuator 130 is disposed at an outer periphery of the display device 100 so as not to be in contact with the adhesive layer 120. Further, the actuator 130 may be disposed to be spaced apart from a side surface of the adhesive layer 120 with an interval of 3 mm to 10 mm. This is because when the actuator 130 is in contact with the adhesive layer 120, vibration generated in the actuator 130 is not transmitted to the center of the cover window 140, but is transmitted into the adhesive layer 120.

The actuator 130 may generate various tactile feedbacks corresponding to the touch applied to the touch panel by the user. For example, the actuator 130 may include an eccentric rotating mass (ERM), a linear resonant actuator (LAR), a piezo ceramic, an electro-active polymers (EAP), and the like, but is not limited thereto. When the display device 100 includes an actuator 130, the display device 100 not only senses the touch of the user, but also provides a sensible haptic effect to the user.

The adhesive layer 120 may be disposed between the display panel 110 and the cover window 140. The adhesive layer 120 is disposed on the display panel 110 and bonds the display panel 110 and the cover window 140. The adhesive layer 120 enhances the adhesiveness between the display panel 110 and the cover window 140 to suppress the failure such as separation between the display panel 110 and the cover window 140. Further, the permeation of external moisture or oxygen into the display panel 110 is reduced to minimize the problems such as dark spot failure and shortened lifespan of the display device 100 due to oxidation of the metal electrode thereby. In the meantime, when the vibration is generated in the actuator 130 disposed on a lower surface of the cover window 140, the vibration transmitted through the surface of the cover window 140 reaches the adhesive layer 120 so that a vibration energy is transmitted or absorbed. In the display device according to the exemplary aspect of the present disclosure, the actuator 130 is spaced apart from the adhesive layer 120 to be disposed at an outer periphery of the display device 100 so that the vibration needs to be maintained and transmitted to a center portion of the display device 100. That is, a vibration transmissibility of the adhesive layer 120 in a horizontal direction needs to be high so that the vibration generated in the actuator 130 is easily transmitted in the horizontal direction.

The adhesive layer 120 may be configured by various materials and structures and may be implemented by a plurality of layers. That is, the adhesive layer 120 may be configured by a plurality of layers configured by materials having different physical properties. For example, the adhesive layer 120 may be configured by a plurality of layers having different modulus. Alternatively, the adhesive layer 120 may be configured by a plurality of layers having different glass transition temperatures Tg.

Here, the modulus is a value obtained by dividing a maximum load in a range that does not lose the elastic force of the material by a cross-sectional area and refers to a ratio of strain to stress. The modulus may be represented by a storage modulus and a loss modulus. The storage modulus refers to an elastic component of a material in which a strain energy is accumulated in the material as a stress. The loss modulus is a component in which an energy given to the material is converted into another energy such as thermal energy to be lost and represents a viscous component of the material. That is, the larger the storage modulus, the larger the elastic property and the larger the loss modulus, the larger the viscous property. Accordingly, when the loss modulus of the material is small, an amount of damped vibration is transmitted to the center of the display device at minimum.

Further, the glass transition temperature Tg refers to a temperature when molecules of a polymer material start to move with activity by the temperature and means a temperature at which the glassy state is changed to a rubbery state. A value of the loss modulus to the storage modulus is expressed with a loss tangent (tan $\delta$) and at this time, a peak of a loss tangent (tan $\delta$) according to the temperature corresponds to a glass transition temperature (Tg). Generally, an adhesive having a high glass transition temperature Tg has a high adhesiveness, excellent peeling strength, heat resistance and moisture resistance reliability, and tends to absorb vibration in a vertical direction. Accordingly, when the glass transition temperature Tg of the material is low, an amount of reduced vibration is transmitted to the center of the display device at minimum.

Accordingly, as mentioned above, the adhesive layer 120 absorbs the vibration energy in the horizontal direction generated in the actuator 130 to cause a problem in that the intensity of the vibration to be transmitted to the center portion of the display device 100 is reduced. In the related art, in order to increase the adhesiveness, a material having a high glass transition temperature Tg or a high loss modulus is used to configure the adhesive layer as a single layer. However, in this case, there may be a problem in that the vibration of the horizontal direction is absorbed by the adhesive layer and a lot of vibration in the vertical direction is transmitted. Accordingly, in the present disclosure, the adhesive layer configured by a material having a low glass transition temperature Tg or a low loss modulus is additionally disposed. Such an adhesive layer lowers the vibration transmissibility in the vertical direction, and increases the vibration transmissibility in the horizontal direction which is transmitted to the center of the display device 100. That is, as the adhesive layer 120 is configured by a plurality of layers having different glass transition temperatures Tg or loss modulus so that the amount of reduced vibration in the horizontal direction is minimized to improve the haptic performance.

In the meantime, when a single layered adhesive layer is configured using a material having a low glass transition temperature Tg or a low loss modulus, the intensity of the vibration which is transmitted to the center of the display device is increased, but the adhesiveness is low so that there may be a problem in that the reliability condition is not satisfied. That is, there may be a problem in that bubbles are generated during the reliability test which are conducted for a long time at a high temperature. Therefore, in the display device 100 according to the exemplary aspect of the present disclosure, the adhesive layer 120 is configured by a plurality of layers having different glass transition temperatures Tg or loss modulus so that the adhesiveness is increased and thus the reliability condition can be satisfied. Accordingly, the haptic performance and high reliability are simultaneously implemented with a structure in which the adhesive layers 120 is configured by a plurality of layers having different physical properties.

Specifically, the adhesive layer 120 includes a first adhesive layer 121 and a second adhesive layer 122. In the display device 100 according to the exemplary aspect, the first adhesive layer 121 may be disposed on the second adhesive layer 122. That is, the second adhesive layer 122 is disposed on the display panel 110 and then the first adhesive layer 121 is sequentially laminated.

The first adhesive layer 121 may be formed of a material having a low loss modulus. Further, the first adhesive layer 121 may be formed of a material having a low glass transition temperature Tg. Specifically, the glass transition temperature Tg of the first adhesive layer 121 is desirably −40° C. or lower. The loss modulus of the first adhesive layer 121 is desirably 5000 Pa to 13000 Pa and the storage modulus is desirably 10000 Pa to 30000 Pa. When the material has a low glass transition temperature of −40° C. or lower or a low loss modulus of 5000 Pa to 13000 Pa, the viscosity of the material is large so that the vibration is less absorbed and thus the vibration transmissibility to the horizontal direction may be improved.

The second adhesive layer 122 may be formed of a material having a high loss modulus. Further, the second adhesive layer 122 may be formed of a material having a high glass transition temperature Tg. That is, the glass transition temperature Tg of the second adhesive layer 122 needs to be higher than −40° C. and is desirably −20° C. to +15° C. The loss modulus of the second adhesive layer 122 is desirably 18000 Pa to 25000 Pa and the storage modulus is desirably 50000 Pa to 100000 Pa. When the material has a high glass transition temperature of −20° C. to +15° C. or has a high loss modulus of 18000 Pa to 25000 Pa, the elastic property of the corresponding material is large so that the adhesiveness is excellent to satisfy the reliability condition.

That is, a difference of the loss modulus of the first adhesive layer 121 and the second adhesive layer 122 is desirably 5000 Pa to 10000 Pa and a difference of the storage modulus is desirably 20000 Pa to 40000 Pa. Further, with regard to the glass transition temperature Tg, a glass transition temperature Tg of the first adhesive layer 121 needs to be lower than the glass transition temperature Tg of the second adhesive layer 122 and the difference thereof is desirably 20° C. or higher. As described above, when the difference of the glass transition temperatures Tg is 20° C. or higher and the difference of the loss modulus is 5000 Pa to 10000 Pa, the physical properties of the first adhesive layer and the second adhesive layer are significantly different. Each adhesive layer supplements the drawbacks of the remaining adhesive layers depending on the difference of the glass transition temperatures Tg and the loss modulus to simultaneously implement the haptic performance and the high reliability.

In order to implement the above-described characteristic, the adhesive layer may be an optical clear adhesive (OCA) or an optical clear resin (OCR). Hereinafter, for the convenience of description, the display device 100 of the present disclosure will be described by assuming that the adhesive layer 120 is an optical clear adhesive (OCA), but is not limited thereto.

The adhesive layer 120 may be produced by curing an adhesive composition and for example, monomers which constitutes the adhesive composition may be polymerized and crosslinked to form the adhesive layer. At this time, the monomer may be formed by a copolymer mainly including a basic monomer (main monomer) and a comonomer. Further, the adhesive composition may further include oligomer, a binder resin, a curing agent, or an additive.

The adhesive layer 120 may be formed of an acrylic-based optical clear adhesive (OCA). At this time, the basic monomer may be an acrylate-based monomer having a low glass transition temperature Tg of −20° C. or lower. For example, the basic monomer may be at least one of butyl acrylate (BA), 2-ethylhexyl acrylate (EHA), and isobornyl acrylate, but is not limited thereto. Here, butyl acrylate has a low glass transition temperature Tg of −55° C., 2-ethylhexyl acrylate (EHA) has a low glass transition temperature Tg of −70° C., and isobornyl acrylate has a low glass transition temperature Tg of −70° C.

The comonomer may be a compound having a high glass transition temperature Tg which is 0° C. or higher. For example, the comonomer may be at least one of acrylamide, acrylonitrile, styrene, methyl methacrylate, and methyl acrylate, but is not limited thereto. Here, relatively, acrylamide has a high glass transition temperature Tg of 165° C., acrylonitrile has a high glass transition temperature Tg of 97° C., styrene has a high glass transition temperature Tg of 80° C., methyl methacrylate has a high glass transition temperature Tg of 105° C., and methyl acrylate has a high glass transition temperature Tg of 8° C.

The glass transition temperature Tg and the loss modulus of the first adhesive layer 121 and the second adhesive layer 122 may be adjusted by a ratio of the monomer and the comonomer. Specifically, the first adhesive layer 121 may be configured by a material having a low glass transition temperature Tg or a low loss modulus. Accordingly, the larger the content of the basic monomer, the lower the glass transition temperature Tg and the loss modulus of the first adhesive layer 121 during a process of polymerizing the basic monomer having a low glass transition temperature Tg and a comonomer having a high glass transition temperature Tg. For example, in the first adhesive layer 121, it is desirable that the basic monomer constitutes 60% to 90% of the entire composition and the comonomer constitutes 10% to 40% of the entire composition. Further, the second adhesive layer 122 may be configured by a material having a high glass transition temperature Tg or a high loss modulus. Accordingly, the smaller the content of the basic monomer, the higher the glass transition temperature Tg and the loss modulus of the second adhesive layer 122 during a process of polymerizing a basic monomer having a low glass transition temperature Tg and a comonomer having a high glass transition temperature Tg. For example, in the second adhesive layer 122, it is desirable that the basic monomer constitutes 10% to 40% of the entire composition and the comonomer constitutes 60% to 90% of the entire composition.

In the meantime, the adhesive layer 120 is configured by the plurality of layers having different physical properties, but the first adhesive layer 121 and the second adhesive layer 122 are configured by applying the same optical clear adhesive, that is, an acrylic-based optical clear adhesive. Accordingly, the difference of the refractive indexes between the plurality of layers may be minimized. Accordingly, the display device 100 with an excellent visibility may also be provided.

FIG. 2 is a schematic cross-sectional view of the display device 100 according to the exemplary aspect of the present disclosure and the display device 100 includes a display panel 110, a first adhesive layer 121, a second adhesive layer 122, and a cover window 140. At this time, the second adhesive layer 122 is disposed on the display panel, the first adhesive layer 121 is disposed on the second adhesive layer 122, and the cover window 140 is disposed on the first adhesive layer 121. Accordingly, the display panel 110, the second adhesive layer 122, the first adhesive layer 121, and the cover window 140 are laminated in this order. That is, the second adhesive layer 122 having a high glass transition temperature Tg and a high loss modulus is disposed immediately above the display panel 110 and the first adhesive layer 121 having a low glass transition temperature Tg and a low loss modulus is disposed immediately below the cover window 140.

In the exemplary aspect as described above, as compared with the adhesive layer configured by a single layer of a material having a high glass transition temperature Tg and a high loss modulus, a vibration transmissibility of the vertical direction is deteriorated. Therefore, the intensity of the vibration which is transmitted to the center of the display device 100 is increased. As a result, as compared with the adhesive layer configured by a single layer of a material having a high glass transition temperature Tg and a high loss modulus, the haptic performance is excellent.

In the meantime, as compared with the adhesive layer 120 configured by a single layer of a material having a low glass transition temperature Tg and a low loss modulus, the adhesiveness is high so that the cover window 140 and the display panel 110 are effectively bonded. As a result, as compared with the adhesive layer 120 configured by a single layer having a low glass transition temperature Tg and a low loss modulus, a probability of satisfying the reliability condition is increased.

Figure 3:
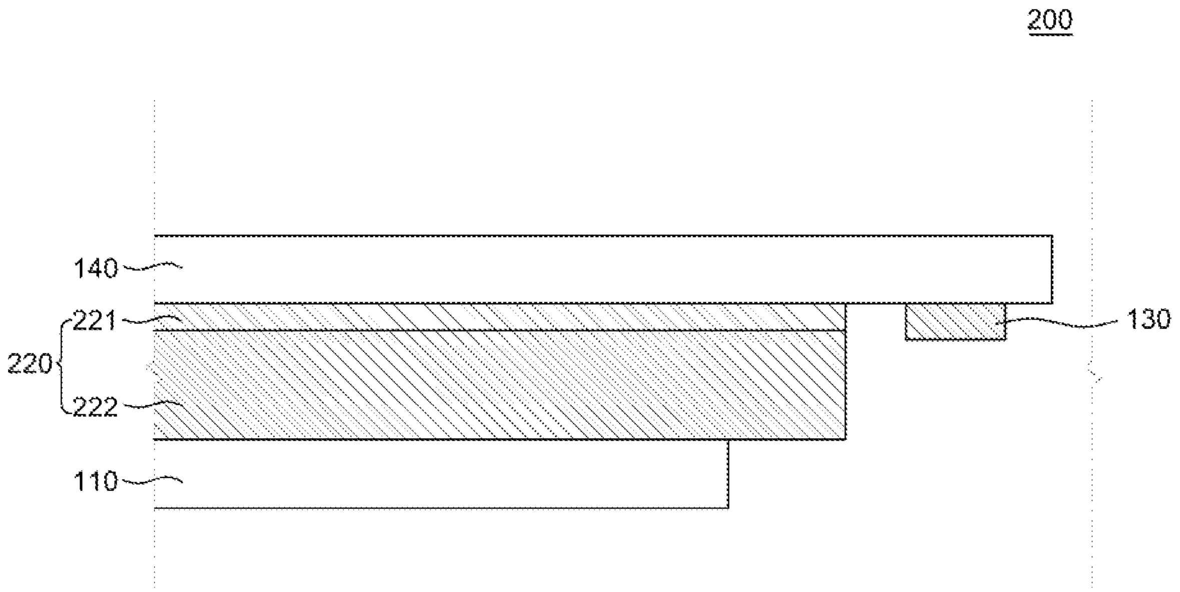
FIG. 3 is a schematic cross-sectional view of a display device according to another exemplary aspect of the present disclosure.

FIG. 3 is a schematic cross-sectional view of a display device according to another exemplary aspect of the present disclosure. Referring to FIG. 3, a display device 200 according to another exemplary aspect of the present disclosure is substantially the same as the display device 100 according to the exemplary aspect illustrated in FIG. 2 except that a first adhesive layer 221 and a second adhesive layer 222 have different thicknesses. Therefore, a description of repeated components will be omitted.

In the display device 200 according to another exemplary aspect of FIG. 3, a thickness of the first adhesive layer 221 is smaller than a thickness of the second adhesive layer 222. Specifically, a thickness of the first adhesive layer 221 may occupy 10% to 30% of the entire adhesive layer 220. For example, the thickness of the first adhesive layer 221 having a low glass transition temperature Tg and a low loss modulus may be 25 μm or more of a thickness of the entire adhesive layer 220 which is 250 μm. This is for effectively ensuring the haptic performance. Further, a thickness of the first adhesive layer 221 may be 75 μm or less of the thickness of the entire adhesive layer 220 which is 250 μm. Since the adhesiveness of the first adhesive layer 221, by doing this, the thickness becomes smaller than the second adhesive layer 222 to maintain the adhesiveness of the adhesive layer 220 so that the high reliability may be ensured.

Similar to the display device 100 according to the exemplary aspect of FIG. 2, the first adhesive layer 221 configured by a material having a low glass transition temperature Tg and a low loss modulus is disposed. Accordingly, as compared with the adhesive layer 220 configured by a single layer of a material having a high glass transition temperature Tg and a high loss modulus, the vibration transmissibility in the vertical direction is lowered and the vibration transmissibility in a horizontal direction to be transmitted to the center of the display device 200 may be increased. That is, the display device 200 according to another exemplary aspect of FIG. 3 also implements an excellent haptic performance.

The reason of forming the thickness of the first adhesive layer 221 to be smaller than the thickness of the second adhesive layer 222 is because when the thickness of the first adhesive layer 221 is increased, the damping ratio is low. Therefore, the haptic performance at the center of the display 200 is excellent, but the adhesiveness of the first adhesive layer 221 is low so that there may be a problem in the reliability condition. Accordingly, when the thickness of the first adhesive layer 221 is formed to be smaller than the thickness of the second adhesive layer 222, the haptic performance and the reliability condition may be simultaneously implemented. However, when the thickness of the first adhesive layer 221 is too small, the damping ratio becomes too high so that the haptic performance may not be properly maintained. Therefore, it is desirable to form the thickness of the first adhesive layer 221 to be 25 μm or larger of 250 μm of the entire thickness, that is, occupy 10% or more of the entire thickness.

Figure 4:
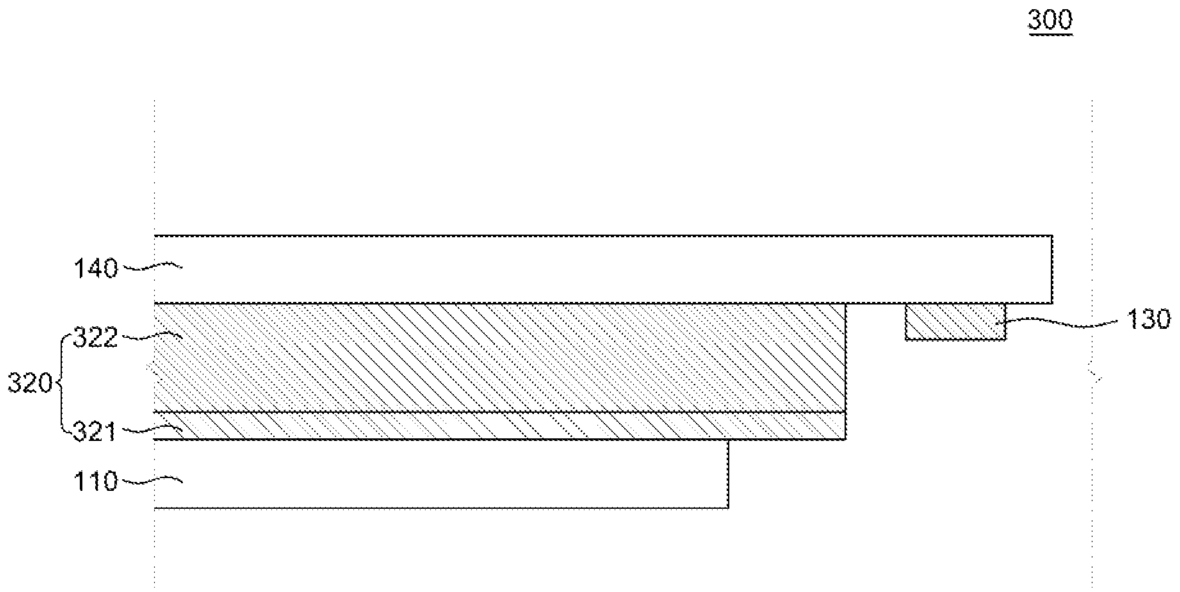
FIG. 4 is a schematic cross-sectional view of a display device according to still an exemplary aspect of the present disclosure.

FIG. 4 is a schematic cross-sectional view of a display device according to still another exemplary aspect of the present disclosure. Referring to FIG. 4, a display device 300 according to still another exemplary aspect of the present disclosure is substantially the same as the display device 200 according to another exemplary aspect illustrated in FIG. 3 except that orders of a first adhesive layer 321 and a second adhesive layer 322 are changed. Therefore, a description of repeated components will be omitted.

Referring to FIG. 4, the first adhesive layer 321 is disposed on the display panel 110, the second adhesive layer 322 is disposed on the first adhesive layer 321, and the cover window 140 is disposed on the second adhesive layer 322. That is, the display panel 110, the first adhesive layer 321, the second adhesive layer 322, and the cover window 140 are laminated in this order.

That is, the first adhesive layer 321 having a physical property of a low glass transition temperature Tg and a low loss modulus is disposed in a lower portion to be in direct contact with the polarizer disposed above the display panel 110. Further, the second adhesive layer 322 having a physical property of a high glass transition temperature Tg and a high loss modulus is disposed in an upper portion to be in direct contact with the cover window 140.

In the display device 300 according to still another exemplary aspect illustrated in FIG. 4, the first adhesive layer 321 and the second adhesive layer 322 having different physical properties are combined. Accordingly, as compared with the adhesive layer 320 configured by a single optical clear adhesive having a high glass transition temperature Tg and a high loss modulus, the damping ratio is low so that the excellent haptic performance may be achieved also in a center of the display device 300.

Further, in the case of the first adhesive layer 321 having a low glass transition temperature Tg and a low loss modulus, the adhesiveness is low. Therefore, also in the display device 200 according to another exemplary aspect illustrated in FIG. 3, the thickness of the first adhesive layer 221 is formed to be smaller than that of the second adhesive layer 222 and this characteristic may also be applied to still another exemplary aspect illustrated in FIG. 4.

However, in still another exemplary aspect of FIG. 4, the first adhesive layer 321 is disposed below the second adhesive layer 322 so that the order of the first adhesive layer 221 and the second adhesive layer 222 in another exemplary aspect of FIG. 3 is reversely changed. By doing this, the first adhesive layer 321 having a low glass transition temperature Tg and a low loss modulus is not disposed below the cover window 140, but is disposed above the polarizer configured by an organic material above the display panel 110. Accordingly, the adhesiveness of the first adhesive layer 321 may be increased more than another exemplary aspect illustrated in FIG. 3 by the organic coupling relationship between the first adhesive layer 321 configured by an acrylic-based optical clear adhesive composition and a polarizer of an organic material.

That is, the display device 300 according to another exemplary aspect of FIG. 4 has a high adhesiveness even in a low damping ratio so that the haptic performance and the reliability condition may be simultaneously effectively implemented.

Hereinafter, the effects of the present disclosure will be described in more detail with reference to Aspects and Comparative Aspects. However, the following Aspects are set forth to illustrate the present disclosure, but the scope of the disclosure is not limited thereto.

Comparative Example 1

A polarizing film and an optical clear adhesive were disposed between two sheets of glasses of 100×100 mm and 0.5 t and then bonded to produce a sample. At this time, the optical clear adhesive was a single layer configured by a material having a glass transition temperature Tg of −20° C., a loss modulus of 18000 Pa to 25000 Pa, a storage modulus of 50000 Pa to 70000 Pa, and a loss tangent (Tan δ) of 2.3.

Comparative Example 2

A sample was produced by the same way as Comparative Aspect 1 except that an optical clear adhesive having a glass transition temperature Tg of −30° C., a loss modulus of 13000 Pa to 18000 Pa, a storage modulus of 30000 Pa to 50000 Pa, and a loss tangent (Tan δ) of 1.8 was used.

Comparative Example 3

A sample was produced by the same way as Comparative Aspect 1 except that an optical clear adhesive having a glass transition temperature Tg of −45° C., a loss modulus of 8000 Pa to 13000 Pa, a storage modulus of 10000 Pa to 20000 Pa, and a loss tangent (Tan δ) of 1.6 was used.

Aspect 1

A polarizing film and an optical clear adhesive were disposed between two sheets of glasses of 100×100 mm and 0.5 t and then bonded to produce a sample. At this time, the optical clear adhesive included a first adhesive layer and a second adhesive layer having different glass transition temperatures Tg and different loss modulus. In the sample, glass, the polarizing film, the second adhesive layer, the first adhesive layer, and glass were laminated from the lower portion in this order. The first adhesive layer was configured by a material having a glass transition temperature Tg of −45° C., a loss modulus of 8000 Pa to 13000 Pa, a storage modulus of 10000 Pa to 20000 Pa, and a loss tangent (Tan δ) of 1.6. The second adhesive layer was configured by a material having a glass transition temperature Tg of −20° C., a loss modulus of 18000 Pa to 25000 Pa, a storage modulus of 50000 Pa to 70000 Pa, and a loss tangent (Tan δ) of 2.3. Further, a thickness of the first adhesive layer was 50 μm and a thickness of the second adhesive layer was 200 μm.

Aspect 2

Except that the laminating order of the first adhesive layer and the second adhesive layer was changed, the sample was produced by the same way as Aspect 1. That is, in the sample, glass, the polarizing film, the first adhesive layer, the second adhesive layer, and glass were laminated from the lower portion in this order.

Experimental Aspect 1—Evaluation of Damping Ratio

A damping ratio of the samples produced according to Comparative Aspects 1, 2, and 3 and Aspects 1 and 2 was measured. The vibration damping refers to a phenomenon that an amplitude of a wave is reduced according to the time or a space and the damping ratio is defined by a ratio of a critical damping coefficient and an actual damping coefficient.

The damping ratio was measured from surfaces of two bonded glasses of 100×100 and 0.5 t with each sample OCA layer therebetween. It was a result of measuring signal (speed) damping according to a time in the center of the sample by applying one cycle of ultrasonic signal with an interval of 66 KHz and 80 ms using an actuator of a piezo coefficient of 400 to 500 and a diameter of 20 mm. As a measurement device, Lase Doppler Vibrometer was used and a point in a portion with a smallest noise was extracted to be fitted by an exponential function and a value σ extracted by the fitting was substituted into a damping ratio calculation equation. That is, when the damping ratio is large, it means that the signal damping is large so that the generated vibration quickly disappears and thus there is no vibration. The result thereof was represented in the following Table 1.

TABLE 1

| Sample name | Comp. Em. 1 | Comp. Em. 2 | Comp. Em. 3 | Em. 1 | Em. 2 |
|---|---|---|---|---|---|
| Glass transition temperature (° C.) | −20° C. | −30° C. | −45° C. | First adhesive layer −45° C. Second adhesive layer −20° C. | Second adhesive layer −20° C. First adhesive layer −45° C. |

TABLE 1-continued

| Sample name | Comp. Em. 1 | Comp. Em. 2 | Comp. Em. 3 | Em. 1 | Em. 2 |
|---|---|---|---|---|---|
| Loss modulus (Pa) | 18 kPa to 25 kPa | 13 kPa to 18 kPa | 8 kPa to 13 kPa | First adhesive layer 8 kPa to 13 kPa Second adhesive layer 18 kPa to 25 kPa | Second adhesive layer 18 kPa to 25 kPa First adhesive layer 8 kPa to 13 kPa |
| Storage modulus (Pa) | 50 kPa to 70 kPa | 30 kPa to 50 kPa | 10 kPa to 20 kPa | First adhesive layer 10 kPa to 20 kPa Second adhesive layer 50 kPa to 70 kPa | Second adhesive layer 50 kPa to 70 kPa First adhesive layer 10 kPa to 20 kPa |
| Loss tangent (Tanδ) | 2.3 | 1.8 | 1.6 | First adhesive layer 1.6 Second adhesive layer 2.3 | Second adhesive layer 2.3 First adhesive layer 1.6 |
| Damping ratio | 0.8 | 0.8 | 0.4 | 0.4 | 0.4 |

Referring to the result of Table 1, it is confirmed that in Comparative Aspect 1 having a high glass transition temperature Tg and a high loss modulus, the damping ratio is 0.8 so that the intensity of the vibration is significantly reduced toward the center of the display device. It is confirmed that in Comparative Aspect 2 having an intermediate glass transition temperature Tg and an intermediate loss modulus, the damping ratio is 0.8 so that also in Comparative Aspect 2, the intensity of vibration is still damped a lot and the haptic performance is degraded.

In contrast, in the case of Comparative Aspect 3 having a low glass transition temperature Tg and a low loss modulus, the damping ratio is sharply lowered to 0.4 so that it is confirmed that the intensity of the vibration is less reduced during a process of going to the center of the display device.

Further, Aspects 1 and 2 are configured by a first adhesive layer having a low glass transition temperature Tg and a low loss modulus and a second adhesive layer having a high glass transition temperature Tg and a high loss modulus and in both Aspects 1 and 2, the damping ratio is 0.4. That is, even though the adhesive layer is configured by a plurality of layers, it is confirmed that if an adhesive layer having a low glass transition temperature Tg and a low loss modulus is included, the damping ratio is low and the haptic performance is excellent.

Experimental Aspect 2—Evaluation of Adhesiveness

An adhesiveness of samples produced according to Comparative Aspects 1, 2, and 3 was evaluated. The adhesiveness evaluation was performed by measuring a force required to separate glasses when an optical clear adhesive is bonded between two sheets of glasses.

In Comparative Aspect 1 having a high glass transition temperature Tg and a high loss modulus, the adhesiveness is 100 $N/cm^2$, so that the separation hardly occurs due to strong adhesiveness. In the case of Comparative Aspect 2 having an intermediate glass transition temperature Tg and an intermediate loss modulus, the adhesiveness is 60 $N/cm^2$ so that the adhesiveness has an intermediate value. In the case of Comparative Aspect 3 having a low glass transition temperature Tg and a low loss modulus, the adhesiveness is 30 $N/cm^2$ which is a weak adhesiveness.

That is, in the adhesiveness evaluation performed in Comparative Aspects 1, 2, and 3 in which the adhesive is configured by a single layer, it is confirmed that the adhesiveness is inversely proportional to the glass transition temperature Tg and the loss modulus.

Experimental Aspect 3—Evaluation of Adhesiveness

A reliability of samples produced according to Comparative Aspects 1, 2, and 3 and Aspects 1 and 2 was evaluated. The reliability evaluation is an experiment to confirm whether the adhesiveness between the glass and the optical clear adhesive is maintained under a high temperature environment. In the present experiment, the sample was tested for 500 hours at a high temperature of 105° C. and when problems such as bubbles were not generated, it was evaluated that the reliability was satisfied. The result thereof was represented in the following Table 2.

TABLE 2

| Sample name | Comp. Em. 1 | Comp. Em. 2 | Comp. Em. 3 | Em. 1 | Em. 2 |
|---|---|---|---|---|---|
| Glass transition temperature (° C.) | −20° C. | −30° C. | −45° C. | First adhesive layer −45° C. Second adhesive layer −20° C. | Second adhesive layer −20° C. First adhesive layer −45° C. |
| Loss modulus (Pa) | 18 kPa to 25 kPa | 13 kPa to 18 kPa | 8 kPa to 13 kPa | First adhesive layer 8 kPa to 13 kPa Second adhesive layer 18 kPa to 25 kPa | Second adhesive layer 18 kPa to 25 kPa First adhesive layer 8 kPa to 13 kPa |
| Storage modulus (Pa) | 50 kPa to 70 kPa | 30 kPa to 50 kPa | 10 kPa to 20 kPa | First adhesive layer 10 kPa to 20 kPa Second adhesive layer 50 kPa to 70 kPa | Second adhesive layer 50 kPa to 70 kPa First adhesive layer 10 kPa to 20 kPa |
| Loss tangent (Tanδ) | 2.3 | 1.8 | 1.6 | First adhesive layer 1.6 Second adhesive layer 2.3 | Second adhesive layer 2.3 First adhesive layer 1.6 |
| Evaluation of reliability | OK | OK | NG | NG | OK |

Referring to Table 2, only in Comparative Aspects 1 and 2 and Aspect 2, it was evaluated that the reliability was satisfied, and in Comparative Aspect 3 and Aspect 1, it was evaluated that the reliability was unsatisfied due to the problem such as the bubbles generated during the reliability evaluation process. That is, as seen from the adhesiveness evaluation conducted for Comparative Aspects 1, 2, and 3, the adhesive having a low glass transition temperature Tg and a low loss modulus has a good haptic performance due to a low damping ratio, but the adhesiveness is low so that the reliability evaluation is not satisfied. In contrast, the adhesive having a high glass transition temperature Tg and a high loss modulus has an insufficient haptic performance, but satisfies a high reliability in terms of the reliability.

In the meantime, Aspects 1 and 2 are configured by a first adhesive layer having a low glass transition temperature Tg and a low loss modulus and a second adhesive layer having a high glass transition temperature Tg and a high loss modulus and the difference of two Aspects are a laminating order. In the case of Aspect 1 in which the second adhesive layer is disposed on a lower portion and the first adhesive layer is disposed on an upper portion, the first adhesive layer having a low glass transition temperature Tg has a low adhesiveness. Accordingly, the adhesiveness between the first adhesive layer and the upper glass is degraded so that bubbles, etc. may be generated.

In contrast, in the case of Aspect 2 in which the first adhesive layer is disposed on a lower portion and the second adhesive layer is disposed on an upper portion, the first adhesive layer having a low glass transition temperature Tg has a low adhesiveness. However, the first adhesive layer is in contact with the polarizing film so that the low adhesiveness may be supplemented. That is, the first adhesive layer having a low glass transition temperature Tg and a low loss modulus is not disposed below the cover window 140, but is disposed above the polarizer configured by an organic material above the display panel. Accordingly, the adhesiveness of the first adhesive layer may be increased more than Aspect 1 by the organic coupling relationship between the first adhesive layer configured by an acrylic-based optical clear adhesive composition and a polarizer of an organic material.

As a result, when a single layer is configured by a material having a high glass transition temperature Tg and a high loss modulus, the adhesiveness is excellent but the haptic performance is insufficient. Further, when the single layer is configured by a material having a low glass transition temperature Tg and a low loss modulus, the haptic performance is excellent but the adhesiveness is insufficient so that the reliability is unsatisfied.

In contrast, when the adhesive layer is formed by a plurality of layers having different physical properties configured by a first adhesive layer having a low glass transition temperature Tg and a low loss modulus and a second adhesive layer having a high glass transition temperature Tg and a high loss modulus, the haptic performance and the reliability may be simultaneously implemented. Specifically, when a first adhesive layer having a low glass transition temperature Tg and a low loss modulus is disposed on a lower portion and a second adhesive layer having a high glass transition temperature Tg and a high loss modulus is disposed on an upper portion, this effect may be more significant.

The exemplary aspects of the present disclosure can also be described as follows:

According to an aspect of the present disclosure, there is provided a display device. The display device comprises a display panel, an adhesive layer on the display panel, a cover window on the adhesive layer, and an actuator on the cover window. The adhesive layer is a plurality of layers having different loss modulus.

The actuator may be on a lower surface of the cover window so as to be spaced apart from a side surface of the adhesive layer.

The adhesive layer may include a first adhesive layer disposed on the display panel, and a second adhesive layer which is disposed on the first adhesive layer and has a loss modulus higher than that of the first adhesive layer.

A difference of the loss modulus of the first adhesive layer and the second adhesive layer may be 5000 Pa to 10000 Pa and a damping ratio at a center of the cover window may be 0.5 or less.

A loss modulus of the first adhesive layer may be 8000 Pa to 13000 Pa and a loss modulus of the second adhesive layer may be 18000 Pa to 25000 Pa.

A thickness of the first adhesive layer may be smaller than a thickness of the second adhesive layer.

A thickness of the first adhesive layer may be 10% to 30% of the entire thickness of the adhesive layer.

The adhesive layer may include a second adhesive layer disposed on the display panel, and a first adhesive layer which is disposed on the second adhesive layer and has a loss modulus lower than that of the second adhesive layer.

The adhesive layer may be configured by an optical clear adhesive (OCA) including a basic monomer and a comonomer, the basic monomer may include at least one selected from a group consisting of butylacrylate, 2-ethylhexyl acrylate, and isobornyl acrylate, and the comonomer may include at least one selected from a group consisting of acrylamide, acrylonitrile, styrene, methyl methacrylate, and methyl acrylate.

The first adhesive layer may be configured with a content of 60 weight % to 90 weight % of the basic monomer and 10 weight % to 40 weight % of the comonomer, and the second adhesive layer may be configured with a content of 10 weight % to 40 weight % of the basic monomer and 60 weight % to 80 weight % of the comonomer.

According to another aspect of the present disclosure, there is provided a display device. The display device comprises a display panel, a cover window on the display panel, a plurality of adhesive layers between the display panel and the cover window, and an actuator on the cover window. The plurality of adhesive layers may be acryl optical clear adhesive layers having different glass transition temperatures Tg.

The actuator may be disposed on a lower surface of the cover window so as to be spaced apart from side surfaces of the plurality of adhesive layers.

The plurality of adhesive layers may include a first adhesive layer disposed on the display panel, and a second adhesive layer which is disposed on the first adhesive layer and has a glass transition temperature Tg higher than that of the first adhesive layer.

A glass transition temperature Tg of the first adhesive layer may be −40° C. or lower, a glass transition temperature Tg of the second adhesive layer may be −20° C. to +15° C., and a damping ratio at a center of the cover window may be 0.5 or less.

A thickness of the first adhesive layer may be smaller than a thickness of the second adhesive layer.

A thickness of the first adhesive layer may be 10% to 30% of the entire thickness of the adhesive layer.

The adhesive layer may include a second adhesive layer disposed on the display panel, and a first adhesive layer which is disposed on the second adhesive layer and has a glass transition temperature Tg lower than that of the second adhesive layer.

The adhesive layer may be configured by an optical clear adhesive (OCA) including a basic monomer and a comonomer, the basic monomer may include at least one selected from a group consisting of butylacrylate, 2-ethylhexyl acrylate, and isobornyl acrylate, and the comonomer may include at least one selected from a group consisting of acrylamide, acrylonitrile, styrene, methyl methacrylate, and methyl acrylate.

The first adhesive layer may be configured with a content of 60 weight % to 90 weight % of the basic monomer and 10 weight % to 40 weight % of the comonomer and the second adhesive layer may be configured with a content of 10 weight % to 40 weight % of the basic monomer and 60 weight % to 80 weight % of the comonomer.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel;

an adhesive layer disposed on the display panel;

a cover window disposed on the adhesive layer; and an actuator disposed on the cover window, wherein the adhesive layer includes a plurality of layers having different loss modulus, and wherein the actuator is spaced apart from a side surface of the adhesive layer, and the actuator is located not to overlap the display panel and to be spaced apart from a side surface of the display panel, wherein the adhesive layer includes an optical clear adhesive (OCA) having a basic monomer and a comonomer, and the basic monomer includes at least one selected from the group consisting of butylacrylate, 2-ethylhexyl acrylate, and isobornyl acrylate, and the comonomer includes at least one selected from a group consisting of acrylamide, acrylonitrile, styrene, methyl methacrylate, and methyl acrylate, and wherein the adhesive layer includes a first adhesive layer and a second adhesive layer, wherein the first adhesive layer includes a content of 60 weight % to 90 weight % of the basic monomer and 10 weight % to 40 weight % of the comonomer, and wherein the second adhesive layer includes a content of 10 weight % to 40 weight % of the basic monomer and 60 weight % to 80 weight % of the comonomer.

2. The display device according to claim 1, wherein the actuator is disposed on a lower surface of the cover window.

3. The display device according to claim 1, the first adhesive layer is disposed on the display panel, and the second adhesive layer is disposed on the first adhesive layer and has a loss modulus higher than that of the first adhesive layer.

4. The display device according to claim 3, wherein a difference of the loss modulus of the first adhesive layer and the second adhesive layer is 5000 Pa to 10000 Pa and a damping ratio at a center of the cover window is 0.5 or less.

5. The display device according to claim 3, wherein a loss modulus of the first adhesive layer is 8000 Pa to 13000 Pa and a loss modulus of the second adhesive layer is 18000 Pa to 25000 Pa.

6. The display device according to claim 3, wherein a thickness of the first adhesive layer is smaller than a thickness of the second adhesive layer.

7. The display device according to claim 6, wherein a thickness of the first adhesive layer is 10% to 30% of the entire thickness of the adhesive layer.

8. The display device according to claim 1, the second adhesive layer is disposed on the display panel, and the first adhesive layer is disposed on the second adhesive layer and has a loss modulus lower than that of the second adhesive layer.

* * * * *